(12) United States Patent
Kashiwagi

(10) Patent No.: US 10,522,967 B2
(45) Date of Patent: Dec. 31, 2019

(54) FIBER LASER SYSTEM, FIBER LASER SYSTEM PRODUCTION METHOD, AND PROCESSING METHOD

(71) Applicant: FUJIKURA LTD., Tokyo (JP)

(72) Inventor: Masahiro Kashiwagi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/450,224

(22) Filed: Mar. 6, 2017

(65) Prior Publication Data

US 2017/0214212 A1 Jul. 27, 2017

Related U.S. Application Data

(63) Continuation of application No. PCT/JP2016/084692, filed on Nov. 24, 2016.

(30) Foreign Application Priority Data

Jan. 26, 2016 (JP) .................................. 2016-012461

(51) Int. Cl.
*B23K 26/00* (2014.01)
*H01S 3/23* (2006.01)
(Continued)

(52) U.S. Cl.
CPC .......... *H01S 3/2383* (2013.01); *B23K 26/707* (2015.10); *H01S 3/067* (2013.01)

(58) Field of Classification Search
CPC ........ B23K 26/00; B23K 26/70; B23K 26/06; B23K 26/0604; B23K 26/067; B23K 26/032; B23K 26/60; B23K 26/0673
(Continued)

(56) References Cited

U.S. PATENT DOCUMENTS 6,236,498 B1 * 5/2001 Freeman .......... H01S 3/094003
359/337.1
8,081,376 B2 * 12/2011 Kakui ................ H04B 10/2935
359/337
(Continued)

FOREIGN PATENT DOCUMENTS

CN 101569066 A 10/2009
CN 104617471 A 5/2015
(Continued)

OTHER PUBLICATIONS

Office Action dated Jan. 10, 2017, issued in counterpart Japanese application No. 2016-012461 (2 pages).
(Continued)

*Primary Examiner* — Dana Ross
*Assistant Examiner* — Ayub A Maye
(74) *Attorney, Agent, or Firm* — Westerman, Hattori, Daniels & Adrian, LLP

(57) ABSTRACT

The present invention achieves a fiber laser having a high reflection resistance. A length of an optical fiber MMF is set so that a condition is satisfied at each point on an individual optical path of a fiber laser (FL2), the condition being that a difference between time at which a power of a forward Stokes beam (SF) is at a maximum value and time at which a power of a backward Stokes beam (SB) is at a maximum value is greater than a sum of a half width at half maximum of the power of the forward Stokes beam (SF) and a half width at half maximum of the power of the backward Stokes beam (SB).

6 Claims, 1 Drawing Sheet

(51) Int. Cl.
*H01S 3/067* (2006.01)
*B23K 26/70* (2014.01)

(58) Field of Classification Search
USPC ............ 219/121.6, 121.61, 62, 76; 372/3, 6
See application file for complete search history.

(56) References Cited

U.S. PATENT DOCUMENTS

| | | | |
|---|---|---|---|
| 8,422,890 B2* | 4/2013 | Mimuro | H01S 3/067 398/195 |
| 2009/0274175 A1 | 11/2009 | Kitabayashi et al. | |
| 2009/0310628 A1* | 12/2009 | Yamazaki | H01S 3/067 372/6 |
| 2011/0194573 A1* | 8/2011 | Yamazaki | H01S 3/067 372/6 |
| 2011/0249319 A1 | 10/2011 | Savage-Leuchs | |
| 2011/0280581 A1 | 11/2011 | Chann et al. | |
| 2015/0229095 A1* | 8/2015 | Miyato | H01S 3/094003 372/6 |
| 2016/0254637 A1 | 9/2016 | Ikoma et al. | |
| 2017/0214213 A1* | 7/2017 | Zediker | H01S 3/302 |

FOREIGN PATENT DOCUMENTS

| | | |
|---|---|---|
| JP | 2015-95641 A | 5/2015 |
| WO | 2012/165389 A1 | 12/2012 |

OTHER PUBLICATIONS

International Search Report dated Jan. 24, 2017, issued in counterpart International Application No. PCT/JP2016/084692 (2 pages).
Office Action dated May 23, 2017, issued in counterpart Japanese Application No. 2016-012461, with English translation. (6 pages).
Search Report dated Dec. 13, 2017, issued in counterpart European Application No. 16838079.8 (8 pages).
Office Action dated Nov. 14, 2018, issued in counterpart Chinese Application No. 201680002509.7, with English translation (10 pages).
Office Action dated May 20, 2019, issued in counterpart EP Application No. 16838079.8. (19 pages).

* cited by examiner

FIBER LASER SYSTEM, FIBER LASER SYSTEM PRODUCTION METHOD, AND PROCESSING METHOD

CROSS-REFERENCE TO RELATED APPLICATIONS

This application is a Continuation of PCT International Application No. PCT/JP2016/084692 filed in Japan on Nov. 24, 2016, which claims the benefit of Patent Application No. 2016-012461 filed in Japan on Jan. 26, 2016, the entire contents of which are hereby incorporated by reference.

TECHNICAL FIELD

The present invention relates to a fiber laser system including a plurality of fiber lasers. The present invention further relates to (i) a method of producing such a fiber laser system and (ii) a method of processing an object with the use of such a fiber laser system.

BACKGROUND ART

In recent years, in the field of material processing, there have been demands for laser devices having an output power of kW. It is difficult, however, to achieve such a laser device with the use of a single fiber laser. Under the circumstances, the use of a fiber laser system, which includes a plurality of fiber lasers and a combiner for combining laser beams outputted from the respective fiber lasers, has been started in the field of material processing.

With such a fiber laser system, there are cases where a laser beam reflected from an object which is being processed (hereinafter referred to as "processing object") re-enters the fiber laser system, and the fiber laser system consequently encounters a problem.

For example, if a backward laser beam, which is propagating in a backward direction in a fiber laser system after being reflected by a processing object, is added to a forward laser beam which is propagating in a forward direction in the fiber laser system, then a power of a laser beam incident on each point in the fiber laser system becomes remarkably high. In such a case, stimulated Raman scattering at each point in the fiber laser system is accelerated, so that oscillation of Stokes beam may occur. It is known that if oscillation of Stokes beam occurs in a fiber laser system, then (i) laser oscillation in fiber lasers becomes unstable and/or (ii) the fiber lasers malfunctions (see Patent Literature 1).

CITATION LIST

Patent Literature

[Patent Literature 1]
Japanese Patent Application Publication Tokukai No. 2015-95641 (Publication date: May 18, 2015)

SUMMARY OF INVENTION

Technical Problem

Meanwhile, a fiber laser has such a characteristic that a power of a laser beam is at a maximum value immediately after an excitation light source is turned on. (This characteristic becomes more notable relative to a shorter period of time it takes for a power of excitation light to rise). Therefore, a power of a forward laser beam propagating in a forward direction in a fiber laser system is at a maximum value immediately after an excitation light source is turned on in each fiber laser. In so doing, if a laser beam reflected by a processing object re-enters the fiber laser system, then a peak of the power of the forward laser beam may overlap a peak of a power of the backward laser beam, so that a power of a laser beam incident on each part of the fiber laser system may become specifically high.

This also applies to a power of Stokes beam. Specifically, a power of a forward Stokes beam propagating in a forward direction in a fiber laser system is at a maximum value immediately after a power of a forward laser beam is at a maximum value. In this case, if a Stokes beam reflected by a processing object re-enters the fiber laser system, then a peak of the power of the forward Stokes beam may overlap a peak of a power of the backward Stokes beam, so that a power of a Stokes beam incident on each part of the fiber laser system may become specifically high.

In a fiber laser system, there are thus cases where powers of laser beams and Stokes beams incident on each part of the fiber laser system become specifically high immediately after an excitation light source of each fiber laser is turned on. In such a case, a probability of the occurrence of oscillation of Stokes beam increases, so that reliability of the fiber laser system decreases. Therefore, in order to achieve a highly reliable fiber laser system, it is necessary to prevent powers of laser beams and Stokes beams from becoming specifically high immediately after an excitation light source of each fiber laser is turned on, so that the probability of the occurrence of oscillation of Stokes beam is decreased.

The present invention has been made in view of the problem, and it is an object of the present invention to achieve a fiber laser system which is more reliable than conventional fiber laser systems, particularly a fiber laser system in which a probability of the occurrence of oscillation of Stokes beam immediately after an excitation light source of each fiber laser is turned on is lower than those in the conventional fiber laser systems.

Solution to Problem

In order to attain the object, a fiber laser system in accordance with an aspect of the present invention includes: a plurality of fiber lasers which generates respective laser beams; a combiner which combines the laser beams together, so that a combined laser beam is obtained; an output section; and an optical fiber which (i) has an input end part and an output end part that are connected to the combiner and the output section, respectively and (ii) guides the combined laser beam from the combiner to the output section, the fiber laser system having (a) individual optical paths in which the respective laser beams generated by the plurality of fiber lasers are not yet combined together and (b) a common optical path in which the respective laser beams generated by the plurality of fiber lasers have been combined together and which has an optical path length, the optical path length of the common optical path being set so that a first condition is satisfied at each point on any of the individual optical paths, the first condition being that, in a case where a reflector is in contact with an exit surface of the output section, a difference between time at which a power of a forward Stokes beam is at a maximum value and time at which a power of a backward Stokes beam is at a maximum value is greater than a sum of a half width at half maximum of the power of the forward Stokes beam and a half width at half maximum of the power of the backward Stokes beam.

With the configuration, a power of a Stokes beam, which is incident on each point on any of the individual optical paths, can be prevented from increasing because of the presence of a backward Stokes beam immediately after an excitation light source of each of the fiber lasers is turned on. This allows for a reduction in probability of the occurrence of oscillation of Stokes beam immediately after the excitation light source of each of the fiber lasers is turned on.

In order to attain the object, a fiber laser system production method in accordance with an aspect of the present invention is a method of producing a fiber laser system, the fiber laser system including: a plurality of fiber lasers which generates respective laser beams; a combiner which combines the laser beams together, so that a combined laser beam is obtained; an output section; and an optical fiber which (i) has an input end part and an output end part that are connected to the combiner and the output section, respectively and (ii) guides the combined laser beam from the combiner to the output section, the fiber laser system having (a) individual optical paths in which the respective laser beams generated by the plurality of fiber lasers are not yet combined together and (b) a common optical path in which the respective laser beams generated by the plurality of fiber lasers have been combined together and which has an optical path length, the method including the step of: setting the optical path length of the common optical path so that a first condition is satisfied at each point on any of the individual optical paths, the first condition being that, in a case where a reflector is in contact with an exit surface of the output section, a difference between time at which a power of a forward Stokes beam is at a maximum value and time at which a power of a backward Stokes beam is at a maximum value is greater than a sum of a half width at half maximum of the power of the forward Stokes beam and a half width at half maximum of the power of the backward Stokes beam.

With the configuration, a power of a Stokes beam, which is incident on each point on any of the individual optical paths, can be prevented from increasing because of the presence of a backward Stokes beam immediately after an excitation light source of each of the fiber lasers is turned on. This allows for a reduction in probability of the occurrence of oscillation of Stokes beam immediately after the excitation light source of each of the fiber lasers is turned on.

In order to attain the object, a processing method in accordance with an aspect of the present invention is a method of processing an object with use of a fiber laser system, the fiber laser system including: a plurality of fiber lasers which generates respective laser beams; a combiner which combines the laser beams together, so that a combined laser beam is obtained; an output section; and an optical fiber which (i) has an input end part and an output end part that are connected to the combiner and the output section, respectively and (ii) guides the combined laser beam from the combiner to the output section, the fiber laser system having individual optical paths in which the respective laser beams generated by the plurality of fiber lasers are not yet combined together, the method including the step of: setting a distance from the output section to the object so that a first condition is satisfied at each point on any of the individual optical paths, the first condition being that a difference between time at which a power of a forward Stokes beam is at a maximum value and time at which a power of a backward Stokes beam is at a maximum value is greater than a sum of a half width at half maximum of the power of the forward Stokes beam and a half width at half maximum of the power of the backward Stokes beam.

With the configuration, a power of a Stokes beam, which is incident on each point on any of the individual optical paths, can be prevented from increasing because of the presence of a backward Stokes beam immediately after an excitation light source of each of the fiber lasers is turned on. This allows for a reduction in probability of the occurrence of oscillation of Stokes beam immediately after the excitation light source of each of the fiber lasers is turned on.

Advantageous Effects of Invention

With the present invention, it is possible to achieve a fiber laser system in which a probability of the occurrence of oscillation of Stokes beam immediately after an excitation light source of each fiber laser is turned on is lower than those in conventional fiber laser systems.

DESCRIPTION OF EMBODIMENTS

Configuration of Fiber Laser System

Figure 1:
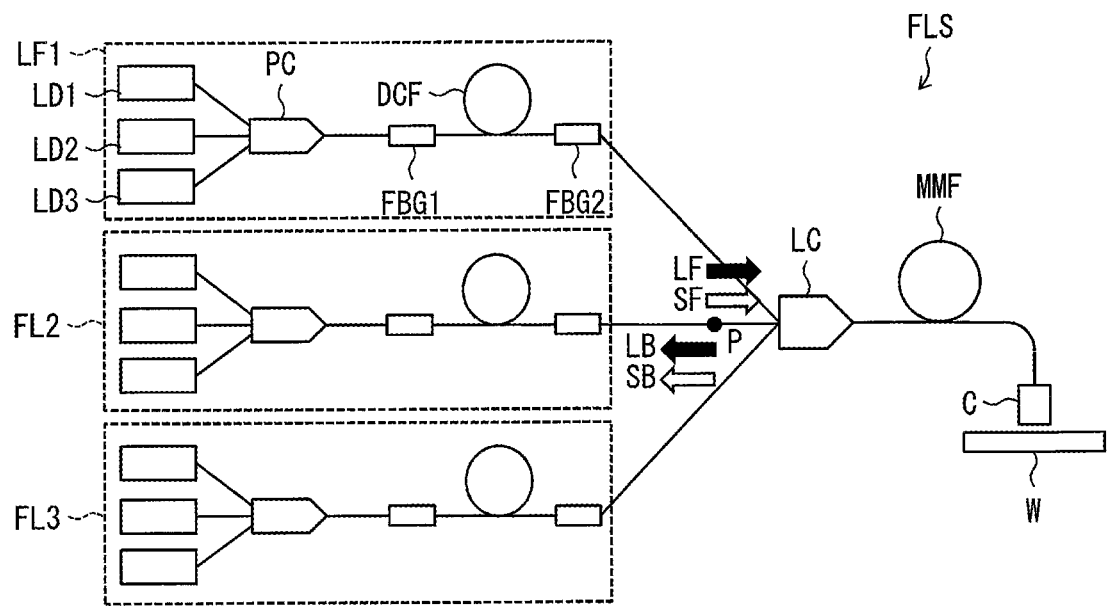
FIG. 1 is a block diagram illustrating a configuration of a fiber laser system in accordance with an embodiment of the present invention.

The following description will discuss, with reference to FIG. 1, a configuration of a fiber laser system FLS in accordance with an embodiment of the present invention. FIG. 1 is a block diagram illustrating a configuration of a fiber laser system FLS.

As illustrated in FIG. 1, the fiber laser system FLS includes (i) n fiber lasers FL1 through FLn (n is an integer), (ii) a laser combiner LC, (iii) an optical fiber MMF, and (iv) an output section C. Although FIG. 1 illustrates a configuration in which n=3, any number of fiber lasers FL1 through FLn can be provided.

Fiber lasers FLi (i=1, 2, . . . , n) serve as laser beam sources for generating respective laser beams. Each of the fiber lasers FLi is connected to a corresponding one of input ports of the laser combiner LC, so that laser beams generated by the respective fiber lasers FLi are supplied to the laser combiner LC via the corresponding ones of the input ports.

The laser combiner LC combines together the respective laser beams generated by the fiber lasers FL1 through FLn, so that a combined laser beam is obtained. An output port of the laser combiner LC is connected to an input end part of the optical fiber MMF, so that the combined laser beam is supplied to a core of the optical fiber MMF.

The optical fiber MMF guides the combined laser beam thus obtained in the laser combiner LC. The optical fiber MMF has an output end part which is connected to the output section C, so that the light guided through the optical fiber MMF is outputted via the output section C.

Note that the optical fiber MMF is a multi-mode fiber in the present embodiment. This makes it possible to restrict various non-linear effects that may occur during a process of guiding a high output-laser beam. Note also that the output section C is a collimator in the present embodiment. This makes it possible to irradiate a processing object W with a laser beam which has been (i) outputted via the output section C and (ii) collimated.

As illustrated in FIG. 1, each of the fiber lasers FLi included in the configuration of the fiber laser system FLS can include (i) m laser diodes LD1 through LDm (m is an integer), (ii) a pump combiner PC, (iii) a high-reflective fiber Bragg grating FBG1, (iii) an amplifying optical fiber DCF, and (iv) a low-reflective fiber Bragg grating FBG2. Although FIG. 1 shows a configuration in which m=3, any number of laser diodes LD1 through LDm can be provided.

Laser diodes LDj (j=1, 2, . . . , m) serve as pump light sources for generating respective pump light beams. Each of the laser diodes LDj is connected to a corresponding one of input ports of the pump combiner PC. Pump light beams generated by the respective laser diodes LDj are supplied to the pump combiner PC via the corresponding ones of the input ports.

The pump combiner PC combines together respective pump light beams generated by the laser diodes LD1 through LDm, so that a combined pump light beam is obtained. The pump combiner PC has an output port which is connected to the amplifying optical fiber DCF via the high-reflective fiber Bragg grating FBG1. A combined pump light beam obtained in the pump combiner PC passes through the high-reflective fiber Bragg grating FBG1, and is then supplied to an inner cladding of the amplifying optical fiber DCF.

The amplifying optical fiber DCF is a double-cladding fiber having a core to which a rare earth element is added. The amplifying optical fiber DCF has an input end part and an output end part which are connected to the high-reflective fiber Bragg grating FBG1 and the low-reflective fiber Bragg grating FBG2, respectively, such that a laser oscillator is formed by the high-reflective fiber Bragg grating FBG1, the amplifying optical fiber DCF, and the low-reflective fiber Bragg grating FBG2. The output end part of the amplifying optical fiber DCF is connected, via the low-reflective fiber Bragg grating FBG2, to a corresponding one of the input ports of the laser combiner LC. Of all laser beams generated in the amplifying optical fiber DCF, laser beams which have passed through the low-reflective fiber Bragg grating FBG2 are supplied to the laser combiner LC.

Characteristics of Fiber Laser System

The following description will focus on an individual optical path in which a laser beam generated by a fiber laser FLi is not yet combined with a laser beam generated by another fiber laser FLk (k≠i). In a case where the configuration illustrated in FIG. 1 is employed, an optical path is formed between (i) an amplifying optical fiber DCF of the fiber lasers FLi and (ii) a corresponding input port of the laser combiner LC, which corresponding input port is connected to the fiber lasers FLi. In a case where a transmitting optical fiber is to be provided between a fiber lasers FLi and an input port of the laser combiner LC, the transmitting optical fiber is also included in the optical path. Such an individual optical path will be hereinafter referred to as "target optical path".

At each point on the target optical path, stimulated Raman scattering may occur. Note that "stimulated Raman scattering" herein refers to a phenomenon in which a laser beam is converted into a Stokes beam (scattered light having a wavelength longer than that of the laser beam) by an interaction between (i) the laser beam and (ii) lattice vibration of quartz glass which is a constituent medium of the target optical path. A power P of a Stokes beam generated by stimulated Raman scattering at each point in a target optical path is proportional to a product $P_L \times P_S$ of (i) a power $P_L$ of a laser beam L which is incident on the point and (ii) a power $P_S$ of a Stokes beam S which is incident on the point.

Note that a power $P_L$ of the laser beam L incident on each point of a target optical path includes not only (i) a power $P_{LF}$ of a forward laser beam LF which is propagating in a forward direction (direction from a laser diode LDi toward the output section C), but also (ii) a power $P_{LB}$ of a backward laser beam LB which is propagating in a backward direction (direction from the output section C toward the laser diode LDi). Likewise, a power $P_S$ of the Stokes beam S incident on each point of a target optical path includes not only (i) a power $P_{SF}$ of a forward Stokes beam SF which is propagating in the forward direction, but also (ii) a power $P_{SB}$ of a backward Stokes beam SB which is propagating in the backward direction. Therefore, the power P of the Stokes beam generated by stimulated Raman scattering at each point in the target optical path is proportional to $P_L \times P_S = (P_{LF} + P_{LB}) \times (P_{SF} + P_{SB})$. Note that a backward laser beam LB and a backward Stokes beam SB are generated mainly by reflection of a forward laser beam LF and a forward Stokes beam SF, respectively, by a processing object W.

FIG. 1 schematically illustrates a forward laser beam LF, a forward Stokes beam SF, a backward laser beam LB, and a backward Stokes beam SB which are incident on a point on the individual optical path of the fiber laser FL2, more specifically, on a point P on an input port of the laser combiner LC, which input port is connected to the fiber laser FL2.

Note that (i) the power $P_{LF}$ of the forward laser beam LF incident on each point on the target optical path and the power $P_{SF}$ of the forward Stokes beam SF incident on the point on the target optical path are each at a maximum value immediately after the laser diodes LD1 through LDN are turned on and, afterward, (ii) the power $P_{LB}$ of the backward laser beam LB (reflection of the forward laser beam LF) incident on the point of target optical path and the power $P_{SB}$ of the backward Stokes beam SB (reflection of the forward Stokes beam SB) incident on the point on the target optical path are each at a maximum value. Therefore, a time period immediately after the laser diodes LD1 through LDN are turned on is a time period in which a power of a Stokes beam (which is proportional to the product of the power $P_S$ of an incident Stokes beam S and the power $P_L$ of an incident laser beam L) increases, that is, a time period in which a probability of the occurrence of oscillation of the Stokes beam (hereinafter referred to as "Stokes oscillation probability") is high.

In particular, in a case where a time difference $\Delta t_s = t_{SB} - t_{SF}$ between time $t_{SF}$ at which the power $P_{SF}$ of the forward Stokes beam SF is at the maximum value and time $t_{SB}$ at which the power $P_{SB}$ of the backward Stokes beam SB is at the maximum value is equal to or less than a sum, $(W_{SF} + W_{SB})/2$, of a half width at half maximum $W_{SF}/2$ of a peak of the power $P_{SF}$ of the forward Stokes beam SF and a half width at half maximum $W_{SB}/2$ of a peak of the power $P_{SB}$ of the backward Stokes beam SB, the maximum value of the power $Ps = P_{SF} + P_{SB}$ of the Stokes beam S may be greater than the maximum value of the power $P_{SF}$ of the forward Stokes beam SF. This means that the presence of the backward Stokes beam SB (presence of reflection by the processing object W) causes the Stokes oscillation probability to increase.

Likewise, in a case where a time difference $\Delta t_L = t_{LB} - t_{LF}$ between time $t_{LF}$ at which the power $P_{LF}$ of the forward laser beam LF is at the maximum value and time $t_{LB}$ at which the power $P_{LB}$ of the backward laser beam LB is at the maximum value is equal to or less than a sum, $(W_{LF}+W_{LB})/2$, of a half width at half maximum $W_{LF}/2$ of a peak of the power $P_{LF}$ of the forward laser beam LF and a half width at half maximum $W_{LB}/2$ of a peak of the power $P_{LB}$ of the backward laser beam LB, a maximum value of a power $PL = P_{LF} + P_{LB}$ of entire laser beams L may be greater than the maximum value of the power $P_{LF}$ of the forward laser beam LF. This means that the presence of the backward laser beam LB (presence of reflection by the processing object W) causes the Stokes oscillation probability to increase.

The Stokes oscillation probability also increases in a case where (1) a time difference $\Delta t_{SL} = t_{LB} - t_{SF}$ between the time $t_{SF}$ at which the power $P_{SF}$ of the forward Stokes beam SF is at the maximum value and the time $t_{LB}$ at which the power $P_{LB}$ of the backward laser beam LB is at the maximum value is equal to or less than a sum, $(W_{SF}+W_{LB})/2$, of the half width at half maximum $W_{SF}/2$ of the peak of the power $P_{SF}$ of the forward Stokes beam SF and the half width at half maximum $W_{LB}/2$ of the peak of the power $P_{LB}$ of the backward laser beam LB and/or (2) a time difference $\Delta t_{LS} = t_{SB} - t_{LF}$ between the time $t_{LF}$ at which the power $P_{LF}$ of the forward laser beam LF is at the maximum value and the time $t_{SB}$ at which the power $P_{SB}$ of the backward Stokes beam SB is at the maximum value is equal to or less than a sum, $(W_{LF}+W_{SB})/2$, of the half width at half maximum $W_{LF}/2$ of the peak of the power $P_{LF}$ of the forward laser beam LF and the half width at half maximum $W_{SB}/2$ of the peak of the power $P_{SB}$ of the backward Stokes beam SB. This is because the power P of the Stokes beam generated by stimulated Raman scattering is proportional to $P_L \times P_S = (P_{LF} + P_{LB}) \times (P_{SF} + P_{SB})$.

The Stokes oscillation probability thus increases in a case where there is a notable overlap on a time axis between (i) the peak of the power $P_{LF}$ or $P_{SF}$ of the forward laser beam LF or the forward Stokes beam SF and (ii) the peak of the power $P_{LB}$ or $P_{SB}$ of the backward laser beam LB or the backward Stokes beam SB. Therefore, according to the fiber laser system FLS in accordance with the present embodiment, a length of the optical fiber MMF (optical path length of a common optical path) is set so as to satisfy the following Conditions 1 through 4 in each point P on the target optical path in a case where a reflector such as the processing object W is in contact with an exit surface of the output section C.

Condition 1: A time difference $\Delta t_S = t_{SB} - t_{SF}$, between (i) time $t_{SF}$ at which a power $P_{SF}$ of a forward Stokes beam SF is at a maximum value and (ii) time $t_{SB}$ at which a power $P_{SB}$ of a backward Stokes beam SB is at a maximum value, is greater than a sum, $(W_{SF}+W_{SB})/2$, of (i) a half width at half maximum $W_{SF}/2$ of the peak of the power of the forward Stokes beam SF and (ii) a half width at half maximum $W_{SB}/2$ of the peak of the power of the backward Stokes beam SB.

Condition 2: A time difference $\Delta t_{SL} = t_{LB} - t_{SF}$, between (i) time $t_{SF}$ at which the power $P_{SF}$ of the forward Stokes beam SF is at a maximum value and (ii) time $t_{LB}$ at which a power $P_{LB}$ of a backward laser beam LB is at a maximum value, is greater than a sum, $(W_{SF}+W_{LB})/2$, of (i) the half width at half maximum $W_{SF}/2$ of the peak of the power of the forward Stokes beam SF and (ii) a half width at half maximum $W_{LB}/2$ of the peak of the power of the backward laser beam LB.

Condition 3: A time difference $\Delta t_{LS} = t_{SB} - t_{LF}$, between (i) time $t_{LF}$ at which a power $P_{LF}$ of a forward laser beam LF is at a maximum value and (ii) time $t_{SB}$ at which the power $P_{SB}$ of the backward Stokes beam SB is at a maximum value, is greater than a sum, $(W_{LF}+W_{SF})/2$, of (i) a half width at half maximum $W_{LF}/2$ of the peak of the power of the forward laser beam LF and (ii) the half width at half maximum $W_{SB}/2$ of the peak of the power of the backward Stokes beam SB.

Condition 4: A time difference $\Delta t_L = t_{LB} - t_{LF}$, between (i) time $t_{LF}$ at which the power $P_{LF}$ of the forward laser beam LF is at a maximum value and (ii) time $t_{LB}$ at which the power $P_{LB}$ of the backward laser beam LB is at a maximum value, is greater than a sum, $(W_{LF}+W_{LB})/2$, of (i) the half width at half maximum $W_{LF}/2$ of the peak of the power $P_{LF}$ of the forward laser beam LF and (ii) the half width at half maximum $W_{LB}/2$ of the peak of the power $P_{LB}$ of the backward laser beam LB.

Figure 2:
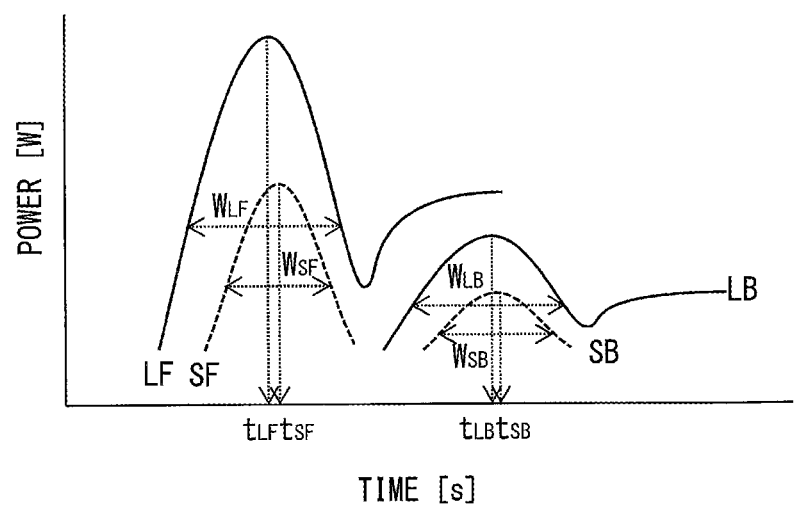
FIG. 2 is a graph schematically illustrating changes over time in respective powers of a forward laser beam (LF), a backward laser beam (LB), a forward Stokes beam (SF), and a backward Stokes beam (SB) at a point on a target optical path in the fiber laser system illustrated in FIG. 1.

FIG. 2 is a graph schematically illustrating changes over time, at a point P at which all of the above Conditions 1 through 4 are satisfied, of powers $P_{LF}$, $P_{LB}$, $P_{SF}$, and $P_{SB}$ of a forward laser beam LF, a backward laser beam LB, a forward Stokes beam SF, and a backward Stokes beam SB, respectively.

At the point P at which the above Conditions 1 through 4 are satisfied, as illustrated in FIG. 2, there is a separation on a time axis between (i) the peak of the power $P_{LF}$ or $P_{SF}$ of the forward laser beam LF or the forward Stokes beam SF and (ii) the peak of the power $P_{LB}$ or $P_{SB}$ of the backward laser beam LB or the backward Stokes beam SB. At the point P at which the above Conditions 1 through 4 are satisfied, therefore, the power of the Stokes beam to be generated can be prevented from being increased by the backward Stokes beam SB or the backward laser beam LB.

In a case where the above Conditions 1 through 4 are satisfied at each point P on the target optical path, the power of a Stokes beam to be generated on the target optical path can be prevented from being increased by a backward Stokes beam SB or a backward laser beam LB. This restricts an increase in Stokes oscillation probability, which increase can occur immediately after the laser diodes LD1 through LDn are turned on. That is, it is possible to achieve a fiber laser system having a reflection resistance higher than that of a conventional fiber laser system.

Note that in a case where the above Conditions 1 through 4 are satisfied at a point P on a target optical path when the processing object W is in contact with the exit surface of the output section C, the above Conditions 1 through 4 are automatically satisfied at the point P even when the processing object W is not in contact with the exit surface of the output section C. This is because the optical path length from the point P to the processing object W is longer when the processing object W is not in contact with the exit surface of the output section C than when the processing object W is in contact with the exit surface of the output section C, and therefore the time differences $\Delta t_S$, $\Delta t_S$, $\Delta t_{LS}$, $\Delta t_L$ are larger when the processing object W is not in contact with the exit surface of the output section C. Therefore, as described above, the length of the optical fiber MMF is set so that the above Conditions 1 through 4 are satisfied at each point P on the target optical path when the processing object W is in contact with the exit surface of the output section C, a fiber laser system FLS having a reflection resistance higher than that of a conventional fiber laser system can be achieved without having any restriction on a method of using the fiber laser system FLS.

In addition, a half-width $W_{LF}$ of the peak of the forward laser beam LF is wider than a half-width $W_{SF}$ of the peak of the power of the forward Stokes beam SF. A time difference $t_{SF} - t_{LF}$ between the time $t_{LF}$ at which the forward laser beam LF is at a maximum value and the time $t_{SF}$ at which the forward Stokes beam SF is at a maximum value is negligible in comparison with the half-widths $W_{LF}$ and $W_{SF}$ (see FIG. 2). Likewise, a half-width $W_{LB}$ of the peak of the backward laser beam LB is wider than a half-width $W_{SB}$ of the peak of the power of the backward Stokes beam SB. A time difference $t_{SB}-t_{LB}$ between the time $t_{LB}$ at which the backward laser beam LB is at a maximum value and the time $t_{SB}$ at which the backward Stokes beam SB is at a maximum value is negligible in comparison with the half-widths $W_{LB}$ and $W_{SB}$ (see FIG. 2). Therefore, in a case where the above Condition 4 is satisfied, the above Conditions 1 through 3 are automatically satisfied. In a case where the above Condition 2 or the above Condition 3 is satisfied, the above Condition 1 is automatically satisfied. Therefore, there are following five possible cases (a) through (e): (a) a case where all of the above Conditions 1 through 4 are satisfied; (b) a case where only the Conditions 1 through 3 are satisfied; (c) a case where only the above Conditions 1 and 2 are satisfied; (d) a case where only the above Conditions 1 and 3 are satisfied; and (e) a case where only the above Condition 1 is satisfied. The above (a) is a case where a highest reflection resistance can be obtained. The above (b) is a case where a next highest reflection resistance can be obtained. The above (c) or (d) is a case where a next highest reflection resistance can be obtained. The above (e) is a case where a next highest reflection resistance can be obtained. Even in the case of the above (e), it still stands true that a higher reflection resistance can be obtained than is the case where the above Condition 1 is not satisfied (i.e. the case of the conventional technology).

Note that the present embodiment discussed the fiber laser system FLS in which the length of the optical fiber MMF is set during production of the fiber laser system FLS so as to satisfy the above Conditions 1 through 4 in each point P on the target optical path in a case where a reflector such as the processing object W is in contact with the exit surface of the output section C. However, a similar effect, which is similar to the effect obtained by setting the length of the optical fiber MMF during production so that the above Conditions 1 through 4 are satisfied in each point on the target optical path, can be obtained by setting, during use of the fiber laser system FLS, a distance from the output section C to the processing object W so that the above Conditions 1 through 4 are satisfied at each point on the target optical path. That is, the similar effect, which is similar to the effect obtained by carrying out a production method including the step of setting the length of the optical fiber MMF so that the above Conditions 1 through 4 are satisfied at each point on the target optical path, can be obtained by carrying out a processing method which is a processing method of processing a processing object W with the use of the fiber laser system FLS and which includes the step of setting the distance from the output section C to the processing object W so that the above Conditions 1 through 4 are satisfied at each point on the target optical path.

Example

A specific example of the fiber laser system FLS necessary to satisfy the above Condition 1 will be briefly described below by considering a case where a half-width $W_{SF}$ of a peak of a power $P_{SF}$ of a forward Stokes beam SF and a half-width $W_{SB}$ of a peak of a power $P_{SB}$ of a backward Stokes beam SB are each 300 ns.

Condition 1 can be expressed as $(W_{SF}+W_{SB})/2<\Delta t_s$, where a time difference $t_{SB}-t_{SF}$ between time $t_{SF}$ at which the power $P_{SF}$ of the forward Stokes beam SF is at a maximum value and time $t_{SB}$ at which the power $P_{SB}$ of the backward Stokes beam SB is at a maximum value is $\Delta t_s$. In order for Condition 1 to be satisfied at a point P on a target optical path, it is only necessary to satisfy $(W_{SF}+W_{SB})/2<2x/v$ where an optical path length from the point P to an output section C is $x$[m]. Note that $v$[m/s] is a speed of light propagating in the fiber laser system FLS.

Note that in a case where (i) $W_{SF}=W_{SB}=300$ ns and (ii) $v=2.0\times10^8$ m/s, the above Condition 1 can be ultimately rewritten as $x>30$ m. Therefore, in a case where, for example, the length of the optical fiber MMF is set to 30 m, the optical path length $x$ from any point P to the output section C on the target optical path becomes greater than 30 m, so that the above Condition 1 is satisfied. This, as described above, makes it possible to achieve a fiber laser system FLS having a reflection resistance higher than that of a conventional fiber laser system.

Summary

A fiber laser system in accordance with an aspect of the present invention includes: a plurality of fiber lasers which generates respective laser beams; a combiner which combines the laser beams together, so that a combined laser beam is obtained; an output section; and an optical fiber which (i) has an input end part and an output end part that are connected to the combiner and the output section, respectively and (ii) guides the combined laser beam from the combiner to the output section, the fiber laser system having (a) individual optical paths in which the respective laser beams generated by the plurality of fiber lasers are not yet combined together and (b) a common optical path in which the respective laser beams generated by the plurality of fiber lasers have been combined together and which has an optical path length, the optical path length of the common optical path being set so that a first condition is satisfied at each point on any of the individual optical paths, the first condition being that, in a case where a reflector is in contact with an exit surface of the output section, a difference between time at which a power of a forward Stokes beam is at a maximum value and time at which a power of a backward Stokes beam is at a maximum value is greater than a sum of a half width at half maximum of the power of the forward Stokes beam and a half width at half maximum of the power of the backward Stokes beam.

With the configuration, a power of a Stokes beam, which is incident on each point on any of the individual optical paths, can be prevented from increasing because of the presence of a backward Stokes beam immediately after an excitation light source of each of the fiber lasers is turned on. This allows for a reduction in probability of the occurrence of oscillation of Stokes beam immediately after the excitation light source of each of the fiber lasers is turned on.

A fiber laser system in accordance with another aspect of the present invention is preferably configured so that the optical path length of the common optical path is set so that a second condition is further satisfied at the each point on any of the individual optical paths, the second condition being that, in the case where the reflector is in contact with the exit surface of the output section, a difference between the time at which the power of the forward Stokes beam is at a maximum value and time at which a power of a backward laser beam is at a maximum value is greater than a sum of the half width at half maximum of the power of the forward Stokes beam and a half width at half maximum of the power of the backward laser beam.

With the configuration, a product of a power of a forward Stokes beam and a power of a backward laser beam, which are incident on each point on any of the individual optical paths, can be prevented from increasing because of the presence of a backward laser beam immediately after an excitation light source of each of the fiber lasers is turned on. This allows for a reduction in probability of the occurrence of oscillation of Stokes beam immediately after the excitation light source of each of the fiber lasers is turned on.

A fiber laser system in accordance with another aspect of the present invention is preferably configured so that the optical path length of the common optical path is set so that a third condition is further satisfied at the each point on any of the individual optical paths, the third condition being that, in the case where the reflector is in contact with the exit surface of the output section, a difference between time at which a power of a forward laser beam is at a maximum value and the time at which the power of the backward Stokes beam is at a maximum value is greater than a sum of a half width at half maximum of the power of the forward laser beam and the half width at half maximum of the power of the backward Stokes beam.

With the configuration, a product of a power of a forward laser beam and a power of a backward Stokes beam, which are incident on each point on any of the individual optical paths, can be prevented from increasing because of the presence of a backward Stokes beam immediately after an excitation light source of each of the fiber lasers is turned on. This allows for a reduction in probability of the occurrence of oscillation of Stokes beam immediately after the excitation light source of each of the fiber lasers is turned on.

A fiber laser system in accordance with another aspect of the present invention is preferably configured so that the optical path length of the common optical path is set so that a fourth condition is further satisfied at the each point on any of the individual optical paths, the fourth condition being that, in the case where the reflector is in contact with the exit surface of the output section, a difference between the time at which the power of the forward laser beam is at a maximum value and the time at which the power of the backward laser beam is at a maximum value is greater than a sum of the half width at half maximum of the power of the forward laser beam and the half width at half maximum of the power of the backward laser beam.

With the configuration, a power of a laser beam, which is incident on each point on any of the individual optical paths, can be prevented from increasing because of the presence of a backward laser beam immediately after an excitation light source of each of the fiber lasers is turned on. This allows for a reduction in probability of the occurrence of oscillation of Stokes beam immediately after the excitation light source of each of the fiber lasers is turned on.

A fiber laser system production method in accordance with an aspect of the present invention is a method of producing a fiber laser system, the fiber laser system including: a plurality of fiber lasers which generates respective laser beams; a combiner which combines the laser beams together, so that a combined laser beam is obtained; an output section; and an optical fiber which (i) has an input end part and an output end part that are connected to the combiner and the output section, respectively and (ii) guides the combined laser beam from the combiner to the output section, the fiber laser system having (a) individual optical paths in which the respective laser beams generated by the plurality of fiber lasers are not yet combined together and (b) a common optical path in which the respective laser beams generated by the plurality of fiber lasers have been combined together and which has an optical path length, the method including the step of: setting the optical path length of the common optical path so that a first condition is satisfied at each point on any of the individual optical paths, the first condition being that, in a case where a reflector is in contact with an exit surface of the output section, a difference between time at which a power of a forward Stokes beam is at a maximum value and time at which a power of a backward Stokes beam is at a maximum value is greater than a sum of a half width at half maximum of the power of the forward Stokes beam and a half width at half maximum of the power of the backward Stokes beam.

With the configuration, a power of a Stokes beam, which is incident on each point on any of the individual optical paths, can be prevented from increasing because of the presence of a backward Stokes beam immediately after an excitation light source of each of the fiber lasers is turned on. This allows for a reduction in probability of the occurrence of oscillation of Stokes beam immediately after the excitation light source of each of the fiber lasers is turned on.

A processing method in accordance with an aspect of the present invention is a method of processing an object with use of a fiber laser system, the fiber laser system including: a plurality of fiber lasers which generates respective laser beams; a combiner which combines the laser beams together, so that a combined laser beam is obtained; an output section; and an optical fiber which (i) has an input end part and an output end part that are connected to the combiner and the output section, respectively and (ii) guides the combined laser beam from the combiner to the output section, the fiber laser system having individual optical paths in which the respective laser beams generated by the plurality of fiber lasers are not yet combined together, the method including the step of: setting a distance from the output section to the object so that a first condition is satisfied at each point on any of the individual optical paths, the first condition being that a difference between time at which a power of a forward Stokes beam is at a maximum value and time at which a power of a backward Stokes beam is at a maximum value is greater than a sum of a half width at half maximum of the power of the forward Stokes beam and a half width at half maximum of the power of the backward Stokes beam.

With the configuration, a power of a Stokes beam, which is incident on each point on any of the individual optical paths, can be prevented from increasing because of the presence of a backward Stokes beam immediately after an excitation light source of each of the fiber lasers is turned on. This allows for a reduction in probability of the occurrence of oscillation of Stokes beam immediately after the excitation light source of each of the fiber lasers is turned on.

Additional Remarks

The present invention is not limited to the embodiments, but can be altered by a skilled person in the art within the scope of the claims. An embodiment derived from a proper combination of technical means each disclosed in a different embodiment is also encompassed in the technical scope of the present invention.

REFERENCE SIGNS LIST

FLS Fiber laser system
FL1 through FLn Fiber laser
LC Laser combiner (combiner)
MMF Optical fiber C Output section
LD1 through LDN Laser diode
PC Pump combiner
FBG1 High reflective fiber Bragg grating
DCF Amplifying optical fiber
FBG2 Low-reflective fiber Bragg grating
W Processing object (reflector)

The invention claimed is:

1. A fiber laser system comprising:
a plurality of fiber lasers which generates respective laser beams;
a combiner which combines the laser beams together, so that a combined laser beam is obtained;
an output section; and
an optical fiber which (i) has an input end part and an output end part that are connected to the combiner and the output section, respectively and (ii) guides the combined laser beam from the combiner to the output section,
the fiber laser system having
(a) individual optical paths in which the respective laser beams generated by the plurality of fiber lasers are not yet combined together and
(b) a common optical path in which the respective laser beams generated by the plurality of fiber lasers have been combined together and which has an optical path length,
wherein the optical path length of the common optical path is set so that a first condition is satisfied at each point on any of the individual optical paths,
wherein the first condition is that a difference between a time at which a power of a forward Stokes beam is at a maximum value and a time at which a power of a backward Stokes beam is at a maximum value is greater than a sum of a half width at half maximum of the power of the forward Stokes beam and a half width at half maximum of the power of the backward Stokes beam with a reflector being in contact with an exit surface of the output section.

2. The fiber laser system as set forth in claim 1, wherein the optical path length of the common optical path is set so that a second condition is further satisfied at the each point on any of the individual optical paths,
the second condition being that, in the case where the reflector is in contact with the exit surface of the output section, a difference between the time at which the power of the forward Stokes beam is at a maximum value and time at which a power of a backward laser beam is at a maximum value is greater than a sum of the half width at half maximum of the power of the forward Stokes beam and a half width at half maximum of the power of the backward laser beam.

3. The fiber laser system as set forth in claim 1, wherein the optical path length of the common optical path is set so that a third condition is further satisfied at the each point on any of the individual optical paths,
the third condition being that, in the case where the reflector is in contact with the exit surface of the output section, a difference between time at which a power of a forward laser beam is at a maximum value and the time at which the power of the backward Stokes beam is at a maximum value is greater than a sum of a half width at half maximum of the power of the forward laser beam and the half width at half maximum of the power of the backward Stokes beam.

4. The fiber laser system as set forth in claim 1, wherein the optical path length of the common optical path is set so that a fourth condition is further satisfied at the each point on any of the individual optical paths,
the fourth condition being that, in the case where the reflector is in contact with the exit surface of the output section, a difference between the time at which the power of the forward laser beam is at a maximum value and the time at which the power of the backward laser beam is at a maximum value is greater than a sum of the half width at half maximum of the power of the forward laser beam and the half width at half maximum of the power of the backward laser beam.

5. A method of producing a fiber laser system,
the fiber laser system comprising:
a plurality of fiber lasers which generates respective laser beams;
a combiner which combines the laser beams together, so that a combined laser beam is obtained;
an output section; and
an optical fiber which (i) has an input end part and an output end part that are connected to the combiner and the output section, respectively and (ii) guides the combined laser beam from the combiner to the output section,
the fiber laser system having
(a) individual optical paths in which the respective laser beams generated by the plurality of fiber lasers are not yet combined together and
(b) a common optical path in which the respective laser beams generated by the plurality of fiber lasers have been combined together and Which has an optical path length,
the method comprising the step of:
setting the optical path length of the common optical path so that a first condition is satisfied at each point on any of the individual optical paths,
wherein the first condition is that, when a reflector is in contact with an exit surface of the output section, then a difference between a time at which a power of a forward Stokes beam is at a maximum value and a time at which a power of a backward Stokes beam is at a maximum value is greater than a sum of a half width at half maximum of the power of the forward Stokes beam and a half width at half maximum of the power of the backward Stokes beam.

6. A method of processing an object with use of a fiber laser system,
the fiber laser system comprising:
a plurality of fiber lasers which generates respective laser beams;
a combiner which combines the laser beams together, so that a combined laser beam is obtained;
an output section; and
an optical fiber which (i) has an input end part and an output end part that are connected to the combiner and the output section, respectively and (ii) guides the combined laser beam from the combiner to the output section,
the fiber laser system having
individual optical paths in which the respective laser beams generated by the plurality of fiber lasers are not yet combined together,
the method comprising the step of:
setting a distance from the output section to the object so that a first condition is satisfied at each point on any of the individual optical paths, wherein the first condition is that a difference between a time at which a power of a forward Stokes beam is at a maximum value and a time at which a power of a backward Stokes beam is at a maximum value is greater than a sum of a half width at half maximum of the power of the forward Stokes beam and a half width at half maximum of the power of the backward Stokes beam.

* * * * *